H. F. FAUPEL.
INCUBATOR.
APPLICATION FILED MAY 8, 1913.
1,086,811.
Patented Feb. 10, 1914.
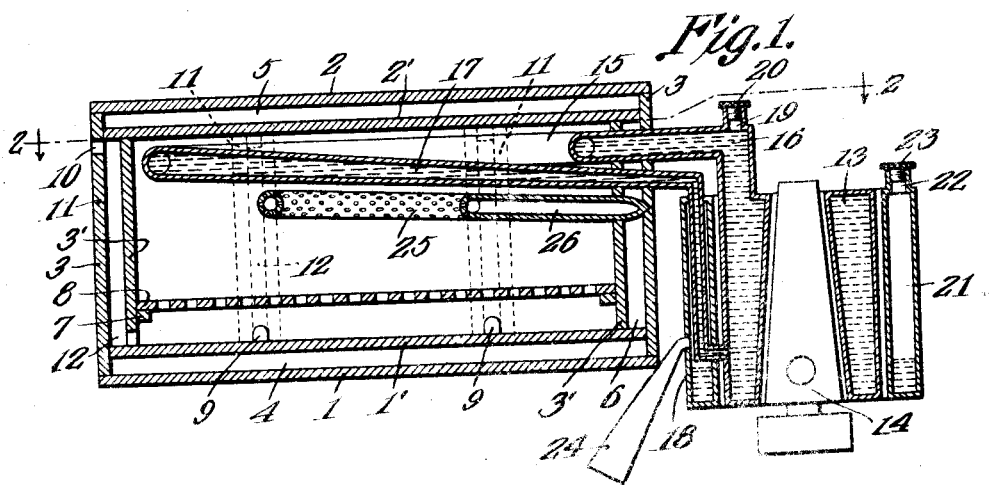
Fig. 1.
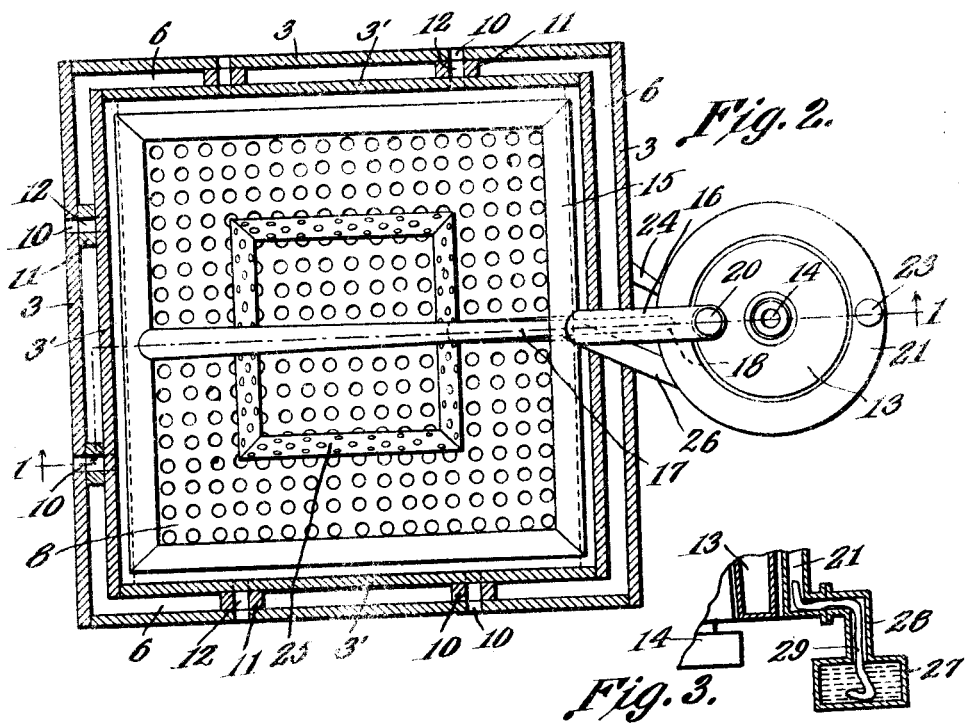
Fig. 2.
Fig. 3.
Henry F. Faupel,
Inventor
Witnesses.
by C. A. Snow & Co.
Attorneys

UNITED STATES PATENT OFFICE.

HENRY F. FAUPEL, OF RATON, NEW MEXICO.

INCUBATOR.

1,086,811.

Specification of Letters Patent.  Patented Feb. 10, 1914

Application filed May 8, 1913. Serial No. 766,438.

*To all whom it may concern:*

Be it known that I, HENRY F. FAUPEL, a citizen of the United States, residing at Raton, in the county of Colfax and State of New Mexico, have invented a new and useful Incubator, of which the following is a specification.

The present invention appertains to incubators and relates more particularly to a hot water system and ventilating system therefor.

It is the object of the present invention to provide a novel and improved hot water heating system for the incubator, which will serve to heat the egg or incubating chamber or compartment, so as to evenly distribute the heat and to maintain the said chamber or compartment at incubation temperature, in combination with a novel and improved system for supplying humidified air to the incubating chamber, and for permitting the foul air to be discharged.

The present invention also comprehends the novel combination of the hot water heating and humidified air supplying systems, which shall enable the incubating chamber to be maintained at the incubation temperature, which shall permit fresh air to be furnished to all points of the incubating or egg chamber in abundance and without interfering with the incubation heat, and at the same time to permit the requisite amount of moisture to be distributed uniformly, the fresh air being merely warmed in order that the oxygen will not loose its incubation value.

With the foregoing general objects outlined and with other objects in view, which will be apparent as the nature of the invention is better understood, the present invention resides in the combination and arrangement of parts and in the details of construction hereinafter described and claimed, it being understood that changes in the precise embodiment of the invention can be made within the scope of what is claimed without departing from the spirit of the invention.

The invention has been illustrated in its preferred embodiment in the accompanying drawing, wherein:—

Figure 1 is a longitudinal vertical section of the incubator, taken on the line 1—1 of Fig. 2. Fig. 2 is a horizontal section taken on the line 2—2 of Fig. 1. Fig. 3 is a sectional detail illustrating a modification.

In carrying out the invention, reference being had in detail to the drawing, there is provided a novel form of incubator case, which comprises the double walled bottom, top and sides providing dead air spaces. The bottom embodies the outer and inner walls 1 and 1', respectively; and the top embodies the outer and inner walls 2 and 2', respectively; and each of the sides embodies the outer and inner walls 3 and 3', respectively; the respective double walls providing the dead air spaces 4, 5 and 6, at the bottom, top and sides. In constructing the case the outer walls 3 of the sides extend completely between the edges or margins of the outer walls 1 and 2 of the bottom and top, the inner walls 1' and 2' of the bottom and top fitting completely within the outer walls 3 of the sides, and the inner walls 3' of the sides fitting between the inner walls 1' and 2' of the bottom and top. Although the particular construction as above described is of advantage and desirable, it is to be understood that the same may be altered as may be necessary or desirable, without departing from the spirit of the invention.

Cleats 7 are secured to the inner faces of the inner walls 3' of the sides at a point slightly above the inner wall of the bottom, and on the cleats 7 there is seated the egg tray or shelf 8, which may be of any suitable construction, and which is provided with air passages. The casing provides an incubating or egg compartment or chamber therein, at the bottom of which, the egg tray or shelf 8 is disposed.

Openings 9 are provided in the inner walls 3 of three sides directly adjoining the wall 1' of the bottom, and corresponding openings 10 are provided in the outer wall 3 of the said sides directly below the edges of the inner wall 2' of the top. Upright cleats or strips 11 are secured between the inner and outer walls of the said sides so as to extend completely between the inner walls of the bottom and top, a pair of cleats 11 being provided for each set of openings 9 and 10, so as to provide a flue or passage 12 leading from the opening 9 to the opening 10. Thus, it will be noted that the flues or passages 12 are shut off from the dead air spaces 6 within the sides, and provide for communication from the egg or incubator chamber to the air there.

The hot water heating system embodies an annular water tank 13 which jackets or encompasses the oil lamp or other heater 14, the said tank being disposed at the side of the case which is devoid of the flues or passages 12. This side of the case, for convenience will be termed the back, and the opposite side, the front. An endless water pipe 15 encircles the upper portion of the egg compartment, and extends around the corners between the sides and top, a supply pipe 16 passing through the back of the case adjoining the top and being connected directly to the corresponding section of the pipe 15. A return pipe 17 passes through the back below the supply pipe 16 and extends across the egg chamber. The inner end of the return pipe 17 is attached to that section of the pipe 15 adjoining the front, and the outer end of the pipe 17 is directed downwardly, as at 18. The supply pipe 16 is attached to the upper end or top of the tank 13, while the outer end of the pipe 17 is attached to the front side of the tank 13 adjoining the bottom or lower end thereof. The supply pipe 16 is also preferably provided with a filling spout or opening 19, normally closed by means of a removable cap or plug 20, which permits the water conduits and tank to be filled, or replenished when necessary.

The ventilating or air supplying system embodies an annular air chamber 21 encompassing and concentric with water tank 13, the upper and lower ends of the air chamber and water tank are preferably flush and the air chamber 21 preferably snugly embraces the water tank 13. The air chamber 21 is also preferably provided with a spout or opening 22 at its upper end, at a point diametrically opposite the point of attachment of the supply pipe 16 to the water tank 13, the spout or opening being normally closed by a cap or plug 23, which is removable. An air inlet funnel 24 is attached to one side of the air chamber 21 at a point slightly above the bottom or lower end, and depends or projects below the bottom of the case, so as to draw fresh air from below the case, it being noted that the case may be supported in any suitable manner, preferably by means of corner legs or standards, which need not be shown or described.

Within the egg chamber, there is disposed the endless air pipe or conduit 25 which is disposed in a plane below the plane of the water pipe 15, but which is of smaller dimensions. The air pipe 25 is preferably concentric with the water pipe 15, and is provided with perforations throughout. The air supply pipe passes through the back of the case below the pipes 16 and 17, and is attached to the adjoining section of the air pipe 25, and to the side of the air chamber 21 adjoining the top or upper end. The depending end 18 of the water return pipe 17 passes downwardly through the top or upper end of the air chamber 21 and then through the inner wall of the air chamber 21, as clearly seen in Fig. 1. Thus, the return pipe 17 passes through a portion of the air chamber, and somewhat serves as a partition between the inlet 24 and the outlet or supply pipe 26.

Suitable dampers may be provided for the flues or passages 12 and a suitable damper or regulator may be provided for the lamp or oil burner 14, the dampers being thermostatically controlled in order that both the heat and air supply may be regulated to a nicety and to this end, any suitable means may be employed, the same not needing description at length or illustration.

The humidification of the air passing through the air chamber 21 is accomplished by pouring water into the air chamber 21 to a level slightly below the end of the funnel 24 attached to the air chamber, it being noted that the spout or opening 22 permits of water being readily pourned into the air chamber. Water may be supplied at the lower end of the air chamber by means of a font or water receptacle 27 attached to the lower end of the air chamber 21 by means of a tube 28, a wick 29 passing through the tube 28 and serving to carry the water from the font to the lower end of the air chamber by capillary action. Either means may be employed for supplying water to the air chamber.

In operation, as the heat is radiated from the lamp or heater 14 to the water tank 13, the water will become heated, and the circulation of water will be established, the water passing upwardly through the supply pipe 16 around the two halves of the pipe 15, and back into the bottom of the tank 15 by means of the return pipe 17, so that a continuous circulation of the water is established. The circulation of hot water through the egg chamber is such, that the heat will be effectively and uniformly transmitted to the several parts of the egg chamber. The heat will be transmitted from the water tank 13 to the air chamber 21, and as a result, the air will be warmed, the water taking up the greater portion of the heat, thus preventing the excessive heating of the air. The air is admitted through the funnel or inlet 24 and circulates through the air chamber 21 to the pipe 26, then flows through the said pipe 26 to the distributing pipe 25 and out of the perforations therein to the egg chamber. The air in passing or circulating through the air chamber 21 above the water in the lower end thereof, will become saturated with vapor, so that the air will be effectively humidified or laden with moisture to more effectively carry out the process of incubation. It will be noted, in this connection, that the water in the air tank 21 is heated by the water tank 13, so that the vapor ascends into the path of the air to be carried off thereby. The humidified air passes from the distributing pipe 25 over the eggs (not shown) disposed on the egg tray or shelf, and then passes through the egg tray or shelf to the openings 9 and then out the flues or passages 12 through the openings 10 to the atmosphere. In this manner, the circulation of air is properly established, humidified air being supplied in abundance, and the foul air being discharged or carried off to the atmosphere through the flues or passages 12.

The hot water heating and air supplying systems have an interdependence of operation, which is highly beneficial. It will be observed that the water tank 13 takes up directly the greater portion of the heat radiated from the heater 14, the air chamber 21 encompassing the water tank 13 so as to somewhat shield the same, and in order that the air may be warmed sufficiently. It will be noted that the hot water return pipe passes through the air chamber so as to facilitate the warming of the air and the proper circulation of the air through the air chamber. The hot water heating system serves to effectively heat the various portions of the egg chamber, the heat being evenly distributed and the egg chamber being maintained at incubation temperature, the supply of fresh air being entirely independent of the heating system that is, the supply of fresh air is not regulated in any manner by the heat, so that fresh air may be furnished to all parts to the egg chamber in abundance and without interfering with the incubating temperature of the egg chamber, and at the same time furnishing the requisite moisture to the egg chamber in order that the proper incubation of the eggs will ensue. There will be no danger of the fresh air becoming excessively or abnormally heated which would produce injurious effects, and furthermore, the heating and ventilation is such as not to chill the eggs or otherwise produce injurious effects.

It is to be understood that one of the sides 3 will be in the form of a door, so as to swing open, which will not affect the operation of the device as above described, when the said side or door is closed, although it is to be understood that any form of door may be provided for the case.

Having thus described the invention, what is claimed as new is:—

In an incubator, an annular water tank, a heater disposed therein, an annular air chamber surrounding the water tank and having inlet above its lower end, an air pipe extending from the air chamber into the case, and a water conduit disposed within the case and embodying a supply pipe and return pipe, the supply pipe being attached to upper end of the water tank, and the outer end of the return pipe extending downwardly through the air chamber and being attached to the lower end of the water tank.

In testimony that I claim the foregoing as my own, I have hereto affixed my signature in the presence of two witnesses.

HENRY F. FAUPEL.

Witnesses:
C. M. BLACKWELL,
E. O. CHRISTIANSON.